(12) United States Patent
Armstrong

(10) Patent No.: US 8,280,775 B2
(45) Date of Patent: Oct. 2, 2012

(54) MOBILE KIOSK SYSTEM

(76) Inventor: Mark Armstrong, Las Vegas, NV (US)

( * ) Notice: Subject to any disclaimer, the term of this patent is extended or adjusted under 35 U.S.C. 154(b) by 469 days.

(21) Appl. No.: 12/551,700

(22) Filed: Sep. 1, 2009

(65) Prior Publication Data

US 2009/0319381 A1 Dec. 24, 2009

Related U.S. Application Data

(63) Continuation-in-part of application No. 11/688,278, filed on Mar. 20, 2007, now Pat. No. 7,584,119.

(51) Int. Cl.
G06Q 30/00 (2012.01)
G06Q 50/00 (2012.01)
G06Q 20/00 (2012.01)

(52) U.S. Cl. ........................... 705/15; 705/16
(58) Field of Classification Search ................ 705/15, 705/16; 353/13; 361/235
See application file for complete search history.

(56) References Cited

U.S. PATENT DOCUMENTS

| | | | |
|---|---|---|---|
| 3,775,954 A * | 12/1973 | Van Schoyck | 56/329 |
| 4,065,006 A * | 12/1977 | Barry | 414/334 |
| 5,271,669 A * | 12/1993 | Pearlson | 312/7.2 |
| 5,630,071 A * | 5/1997 | Sakai et al. | 705/21 |
| 5,692,342 A * | 12/1997 | Devlin, Jr. | 52/36.1 |
| 6,415,555 B1 * | 7/2002 | Montague | 52/36.2 |
| 6,460,040 B1 * | 10/2002 | Burns | 1/1 |
| 6,742,232 B2 * | 6/2004 | Kussius | 29/244 |
| 6,973,437 B1 * | 12/2005 | Olewicz et al. | 705/15 |
| 7,327,863 B1 * | 2/2008 | Green et al. | 382/128 |
| 2003/0137584 A1 * | 7/2003 | Norvell et al. | 348/61 |
| 2003/0230693 A1 * | 12/2003 | Yen et al. | 248/346.3 |
| 2004/0177008 A1 * | 9/2004 | Yang | 705/26 |
| 2006/0006025 A1 * | 1/2006 | Dev et al. | 186/36 |
| 2006/0028398 A1 * | 2/2006 | Willmore | 345/2.3 |
| 2006/0122896 A1 * | 6/2006 | Parsley | 705/26 |
| 2006/0143087 A1 * | 6/2006 | Tripp et al. | 705/15 |
| 2006/0250784 A1 * | 11/2006 | Langone | 362/101 |
| 2006/0282329 A1 * | 12/2006 | Lund | 705/15 |
| 2007/0045397 A1 * | 3/2007 | Ireland et al. | 235/379 |
| 2007/0204705 A1 * | 9/2007 | Kumar et al. | 73/866.5 |
| 2007/0236174 A1 * | 10/2007 | Kaye | 320/112 |

(Continued)

FOREIGN PATENT DOCUMENTS

IT 282892 A2 * 9/1988

(Continued)

OTHER PUBLICATIONS

Wireless e-Toolbox, Canada Newswire: Ottawa: Oct 17, 2002, pp. 1.*

*Primary Examiner* — Matthew Gart
*Assistant Examiner* — Harshad Parikh
(74) *Attorney, Agent, or Firm* — Dale J. Ream

(57) ABSTRACT

A restaurant system includes an electronic kiosk having opposed first and second sides. A first display is situated on the first side for use by the customer and a second display is situated on the second side for use by a bartender. One aspect of the restaurant system includes a mobile kiosk system that includes a rail having distal and proximate ends and extends therebetween. The electronic kiosk includes a base that extends adjacent the rail. Inductive or conductive electrical components transmit an electrical current to power a processor, input device, and output device of the kiosk. The base is movable only along the rail between the rail distal and proximate ends.

11 Claims, 15 Drawing Sheets

U.S. PATENT DOCUMENTS

2007/0240077 A1* 10/2007 McCarthy et al. ............ 715/802
2008/0272147 A1* 11/2008 Buker et al. .................. 222/113
2008/0288357 A1* 11/2008 Stambaugh et al. ............ 705/15
2009/0109130 A1*  4/2009 Murphy et al. ................. 345/31
2009/0319381 A1* 12/2009 Armstrong ...................... 705/15
2010/0328191 A1* 12/2010 Smith et al. .................... 345/1.3
2011/0039602 A1*  2/2011 McNamara et al. .......... 455/566
2011/0187142 A1*  8/2011 Cohen et al. .................... 296/21

FOREIGN PATENT DOCUMENTS

IT          0282892 A2 *  9/1988

* cited by examiner

MOBILE KIOSK SYSTEM

CROSS REFERENCE TO RELATED APPLICATION

The present application is a continuation in part of U.S. Patent Application No. 11/688,278, filed Mar. 20, 2007 now U.S. Pat. No. 7,584,119 and titled "RESTAURANT SYSTEM", which is incorporated herein by reference.

BACKGROUND OF THE INVENTION

This invention relates generally to restaurant ordering systems and, more particularly, to a restaurant system that incorporates innovative media and advertising components, mixed drink preparation devices, a wireless headset component, and a mobile kiosk system.

Most restaurants share several common goals, such as providing accurate and efficient service as well as providing an enjoyable dining experience. When either goal is not met, the customers may be dissatisfied and may not return to the restaurant with any frequency or, worse yet, may not return at all. Some restaurants are successful with efficiency or with providing a friendly and enjoyable dining experience but few satisfy both goals fully or regularly. Other restaurants, particularly bars and casinos provide bartending with so-called "flair" techniques, e.g. tossing or spinning liquor containers prior to or in the process of preparing mixed drinks.

Various electronic devices have been proposed in the art for either improving the efficiency of ordering or order fulfillment, such as by increasing speed or accuracy or both. Although assumably effective for their intended purposes, the existing devices do not maximize the entertainment value to customers while simultaneously assisting bartenders, kitchen staff, waiters, etc. with accurately and quickly preparing mixed beverages or food items. Another limitation of the prior art is that only a single user may use a kiosk or point of sale device during a dining event, requiring a restaurant to have one such device situated for every customer at the same time. In other words, an electronic device, such as an ordering device, must be located at multiple locations on a bar, at every table, etc.

Therefore, it would be desirable to have a restaurant system having an electronic kiosk that may operate as a napkin dispenser or other condiment dispenser as well as an electronic display device. Further, it would be desirable to have a restaurant system having a database of drink recipes and one or more audio or visual means of communicating the recipes to a bartender. In addition, it would be desirable to have a restaurant system having innovative electronic mixing tins or pour spout devices for entertaining restaurant patrons while mixing beverages. Still further, it would be desirable to have a restaurant system having a mobile kiosk system so that a single kiosk may be slidably moved for use by multiple customers during the same dining experience.

SUMMARY OF THE INVENTION

Accordingly, a restaurant system according to the present invention includes an electronic kiosk having generally opposed first and second sides. A first display may be situated on the first side of the kiosk for use by the customer and a second display may be situated on the second side of the kiosk for use by a bartender. The electronic kiosk includes a first input device for use by the customer. A processor is in data communication with the first and second displays and with the first input device to retrieve data from the first input device and to actuate the first and second displays. As the first input device may be a touch screen display interface, a restaurant patron may select from food or drink ordering options, may choose to watch television or other special programming, or just allow advertisements to be displayed. The first input device may also include a card reader for receiving payment.

The kiosk defines a storage area that is configured to contain napkins or condiments. The kiosk may include a second input device for use by a bartender, such as a touch screen. The second display may be in communication with a processor for displaying selected drink recipes. Thus, a user selects a desired drink using the first display, the corresponding drink recipe may be displayed on the second display to aid the bartender in fulfilling the order. In another aspect of the invention, the bartender may wear a headset remote from the processor to which the drink recipe may be transmitted and audibly recited into the bartender's ears to assist in preparing the drink.

The system may also include an innovative electronic mixing tin for providing a bartender with instant access to drink recipes while also increasing the ambiance of the bar and entertainment value of watching a bartender mix drinks. Specifically, the mixing tin may include an LCD screen on its exterior by which to display drink recipes or even advertisements and lighting displays.

Another aspect of the restaurant system includes a pour spout for attachment to liquor bottles that may be lit up with LED's. This component of the system would be especially effective when used with "flair" bartending techniques but also provides enhanced ambiance to any bar environment.

Yet another aspect of the restaurant system described above is to also have a mobile kiosk system that includes a rail having distal and proximate ends and extending therebetween. The electronic kiosk includes a base that extends adjacent the rail. Inductive or conductive electrical components transmit an electrical current to power the processor, input device, and output device of the kiosk. The base is movable only along the rail between the rail distal and proximate ends. In addition, the kiosk may be rotated on the rail or completely removed from the rail.

Therefore, a general object of this invention is to provide a restaurant system for improving order and order fulfillment efficiency as well as improving a restaurant's ambiance and entertainment value.

Another object of this invention is to provide a restaurant system, as aforesaid, that provides an interactive media and ordering component to a restaurant patron and an order fulfillment component to a restaurant employee.

Still another object of this invention is to provide a restaurant system, as aforesaid, in which a napkin or condiment dispenser includes one or more electronic displays.

Yet another object of this invention is to provide a restaurant system, as aforesaid, that includes a remote headset for audibly reciting mixed drink recipe instructions to a bartender.

A further object of this invention is to provide a restaurant system, as aforesaid, having electronic mixing tin and pour spout devices for enhancing the ambiance and entertainment value of a bar or restaurant environment.

A still further object of this invention is to provide a restaurant system, as aforesaid, that provides new and exciting opportunities for options for presenting advertising messages, food/drink specials, schedules, etc. to patrons of a restaurant.

Another object of this invention is to provide a restaurant system, as aforesaid, in which a kiosk may be mounted on a rail for movement therealong, such that the kiosk may be used by multiple patrons during their dining experience.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 4b is a top view of the pour spout device as in FIG. 4a;

FIG. 5a is a sectional view taken along line 5a-5a of FIG. 4b;

FIG. 5b is an isolated portion on an enlarged scale of the pour spout device taken from FIG. 5a;

DESCRIPTION OF THE PREFERRED EMBODIMENT

A restaurant system 100 according to the present invention will now be described in detail with reference to FIGS. 1 through 9 of the accompanying drawings. More particularly, a restaurant system 100 (which may also be referred to herein as a bar system) according to the current invention includes an electronic kiosk 110.

Figure 6:
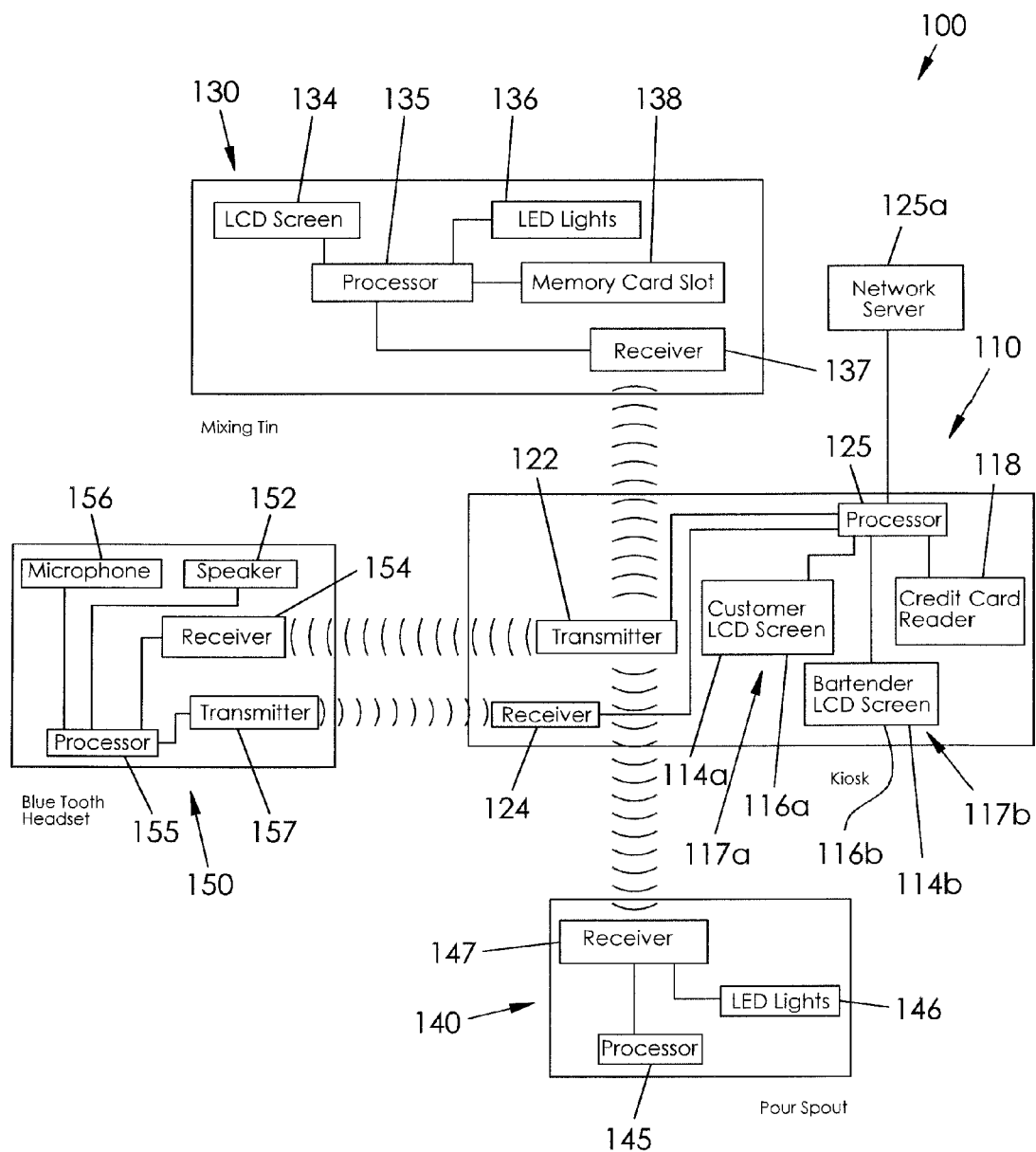
FIG. 6 is a block diagram of the electronic components according to the preferred embodiment of the restaurant system.
Figure 7A:
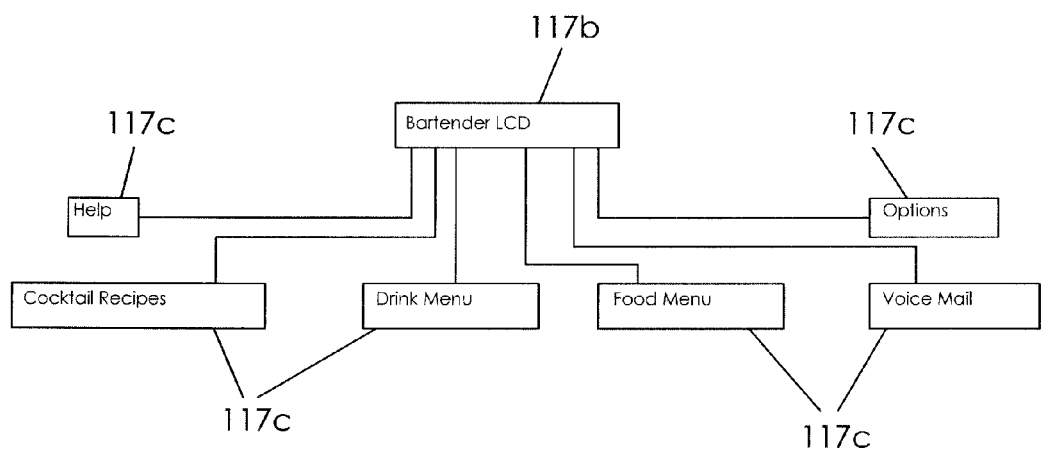
FIG. 7a is a block diagram illustrating the display options provided by the touch screen bartender display.
Figure 7B:
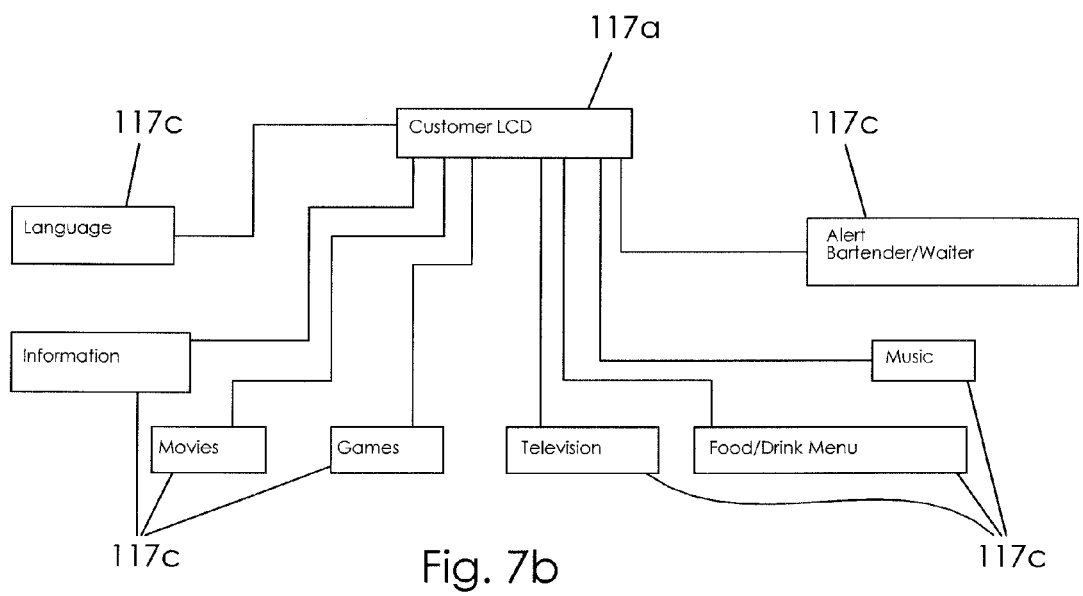
FIG. 7b is a block diagram illustrating the display options provided by the touch screen customer display.

The electronic kiosk 110 has generally opposed sides 112a, 112b. A display 114a may be on the side 112a for use by a customer, and another display 114b may be on the side 112b for use by a bartender. The electronic kiosk 110 may include an input device 116a for use by the customer and/or an input device 116b for use by the bartender (FIG. 6). As shown in FIG. 6, a touch screen 117a may serve as both the display 114a and the input device 116a, and a touch screen 117b may serve as both the display 114b and the input device 116b. FIGS. 7a and 7b show various predetermined (and non-exclusive) input and display options 117c that may be associated with the touch screens 117a, 117b, respectively. Alternately, or additionally, at least one input device 116a, 116b may include a card reader 118 for receiving payment.

Figure 1:
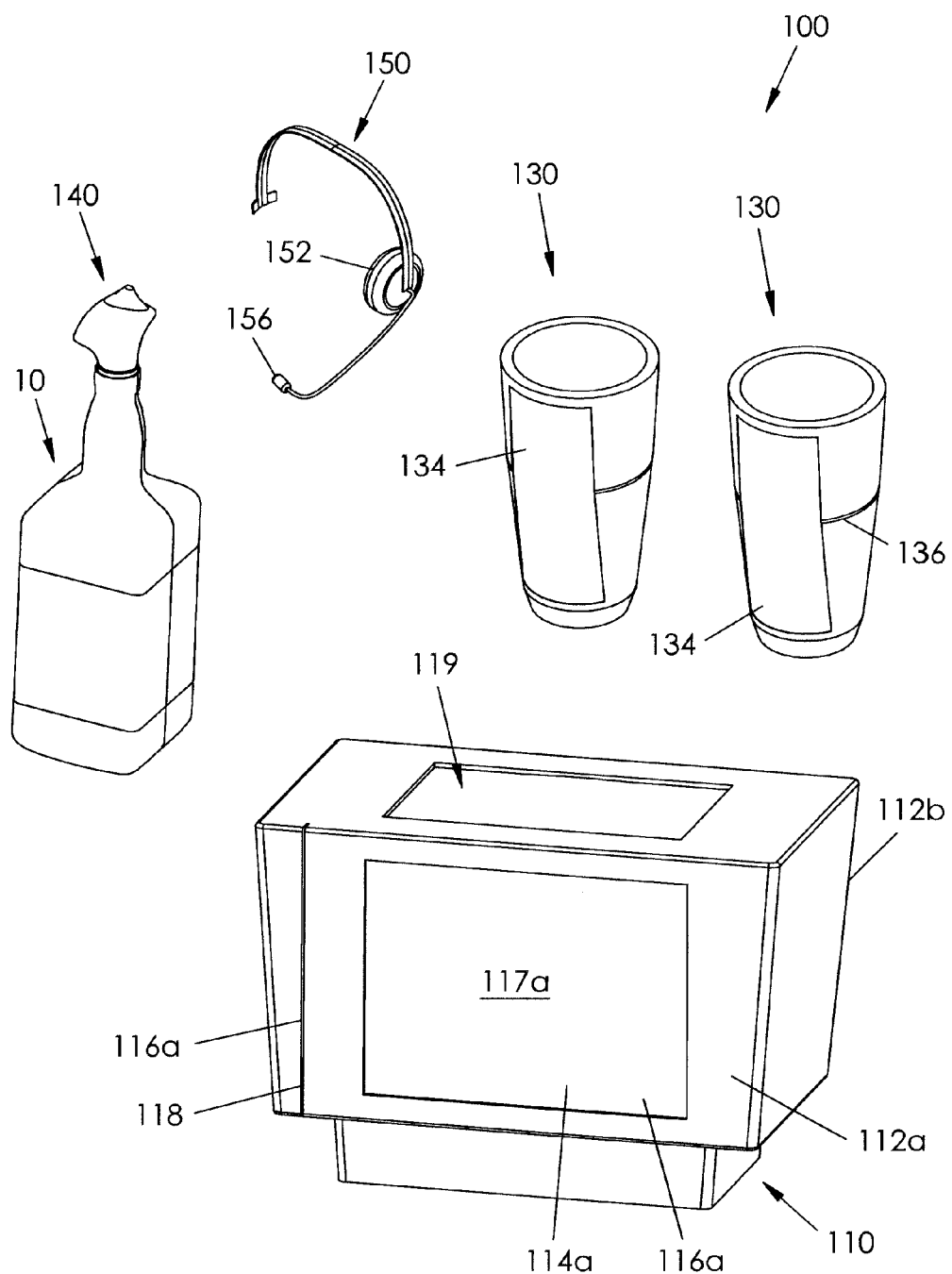
FIG. 1 is a perspective view of a restaurant system according to a preferred embodiment of the present invention.
Figure 2:
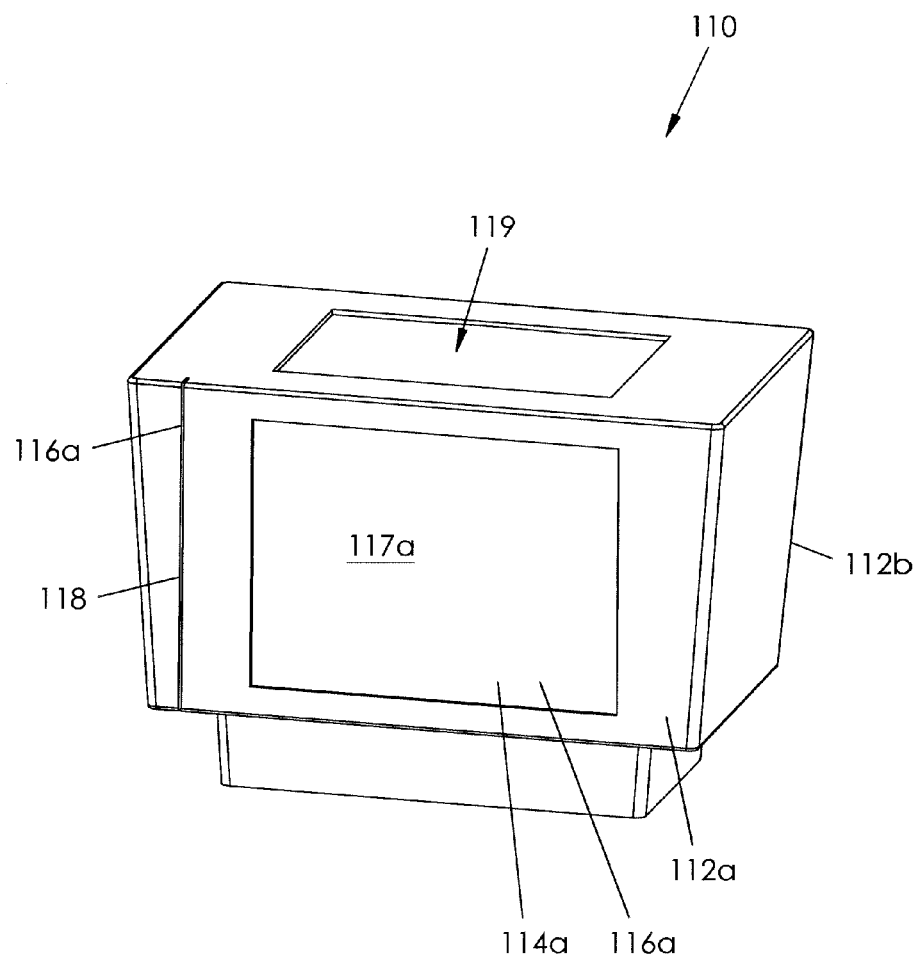
FIG. 2 is an isolated perspective view of a kiosk as in FIG. 1.

As shown in FIGS. 1 and 2, the electronic kiosk 110 may define a storage area 119 configured to hold napkins or condiments (including such typical condiments as salt, pepper, and ketchup and such bar condiments as limes, olives, and straws, among others). The electronic kiosk 110 may include a transmitter 122 and/or a receiver 124 (FIG. 6). A processor 125 may be in data communication with the displays 114a, 114b, the input devices 116a, 116b, the transmitter 122, and the receiver 124 (FIG. 6). Means for introducing programming to the processor 125 may be included, such as a connection (e.g., hard wired or wireless) to a network 125a (FIG. 6) or a removable memory device, for example.

Alternatively, the electronic kiosk 110 may include only a first display 114a for use by the consumer. This embodiment may be adequately explained with reference to FIG. 1-2 and 7b. The kiosk 110 would also include the kiosk processor 125 in communication with the first display 114a for actuating the first display 114a. Preferably, the processor 125 would include programming enabling the first display 114a to display pictures or descriptions of menu items or other options as will be described later. In this embodiment, the kiosk 110 also defines a storage area 119 configured to hold napkins or condiments as described previously. It is understood that a kiosk 110 with a first display 114a and storage area 119 for customer use may be used independently or in combination with the other unique elements of a restaurant system as will be described later in greater detail.

Figure 3B:
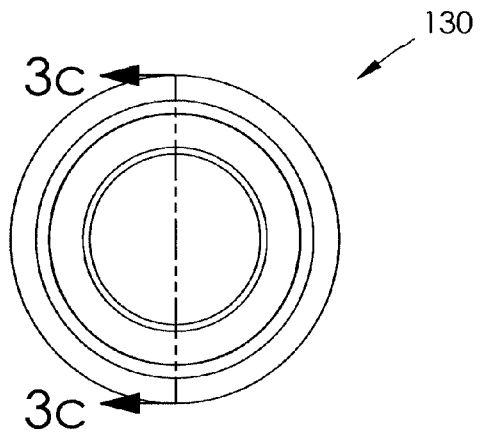
FIG. 3b is a top view of the mixing tin as in FIG. 3b.
Figure 3A:
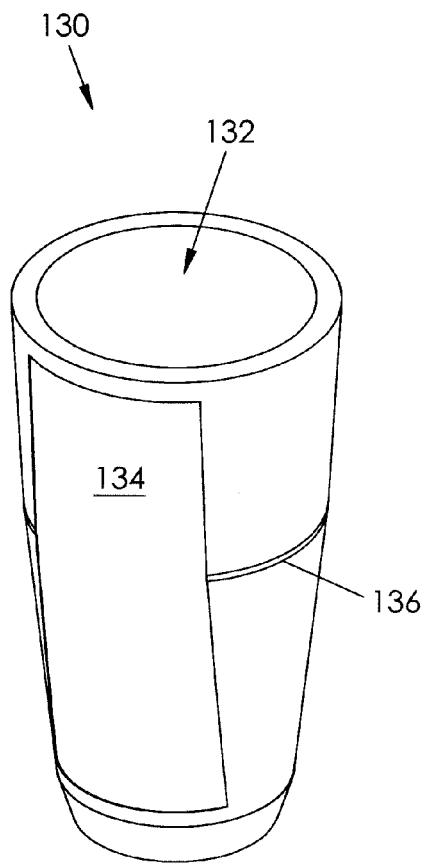
FIG. 3a is an isolated perspective view of a mixing tin as in FIG. 1.
Figure 3C:
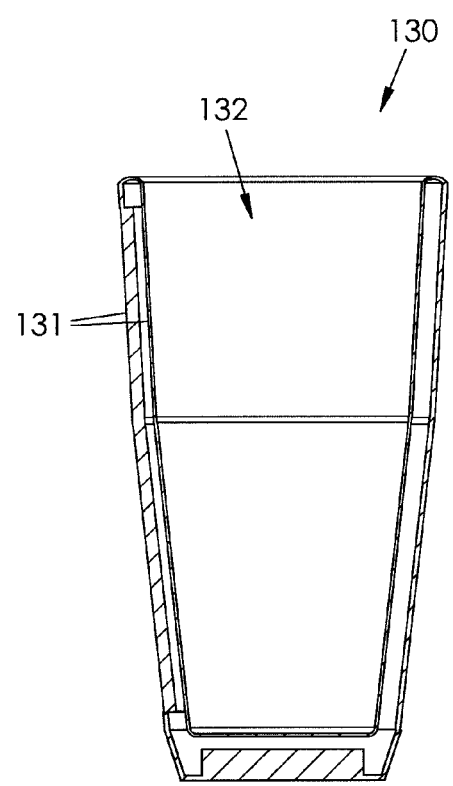
FIG. 3c is a sectional view taken along line 3c-3c of FIG. 3b.
Figure 4A:
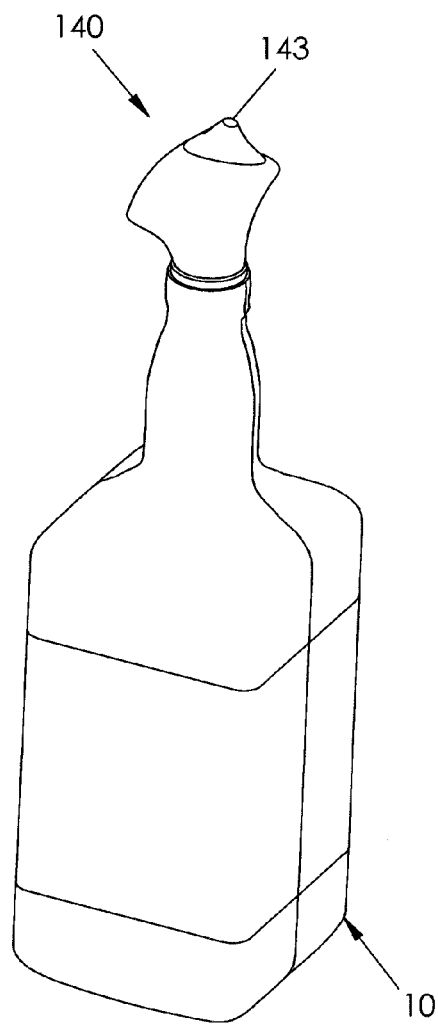
FIG. 4a is a perspective view on an enlarged scale of a lighted pour spout device as in FIG. 1.
Figure 4B:
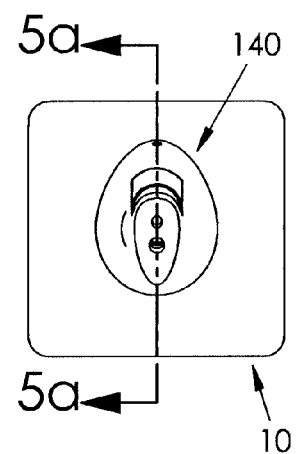
Figures 5A, 5B:
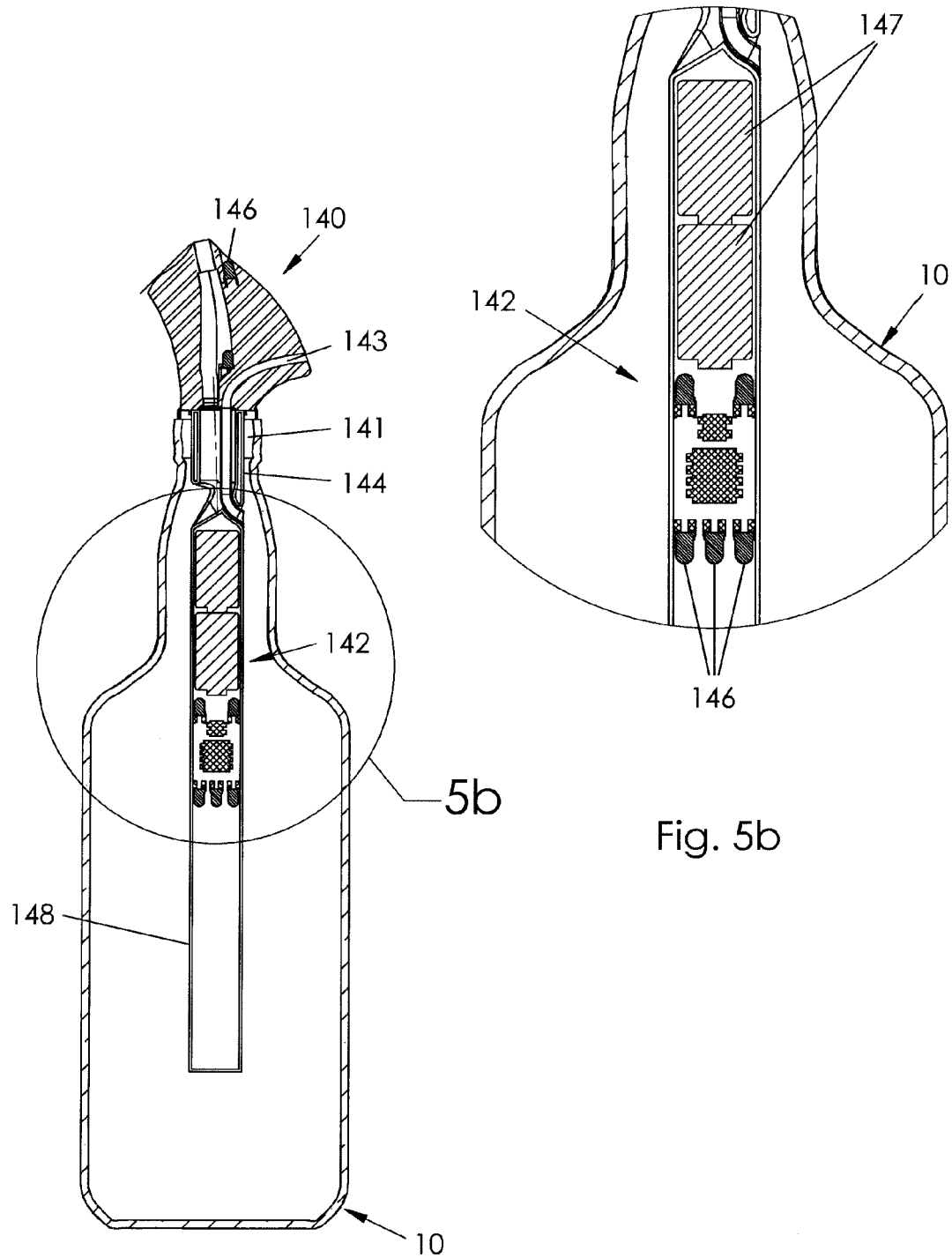

The restaurant system 100 may include a mixing tin 130 as shown in FIGS. 3a through 3c. The mixing tin 130 may include a housing with a double wall construction (i.e., two walls 131 spaced apart in a waterproof manner) that defines a mixing area 132. The mixing tin 130 may include a display 134 (e.g., a LCD display, etc.), and the display 134 may be sandwiched between the walls 131 for durability. If sandwiched between the walls 131, an outer wall 131 may include a transparent material so that the display 134 may be seen from outside the mixing area 132. The mixing tin 130 may include at least one light 136 (e.g., a LED, etc.), and a processor 135 may be in data communication with the display 134 and the light(s) 136 for actuating the display 134 and the light(s) 136 (FIG. 6). It is understood that various other lighting options are possible, such as means for continual or periodic "backlighting". Means for providing data to the mixing tin processor 135 may be included. More particularly, the mixing tin 130 may include a receiver 137 in data communication with the processor 135 for receiving data from the kiosk transmitter 122 (FIG. 6), and/or the mixing tin 130 may include a removable memory device 138, for example. In this regard, data such as drink recipes may be received and displayed on the display so as to aid a bartender in preparing drinks for customers.

As shown in FIGS. 4a through 6, the restaurant system 100 may include a pour spout 140 for use with a bottle 10 containing a fluid (e.g., a bottle of alcohol, mixer, cooking oil, etc.). The pour spout 140 includes a coupling portion 141 that has a configuration complementary to a configuration of the bottle 10 so that the coupling portion 141 may be selectively attached to the bottle 10. The coupling portion 141 may fit inside the bottle 10 similar to a cork, or the bottle may be threaded and the coupling portion 141 may attach to the bottle threads, for example. An interior portion 142 of the pour spout 140 is configured to extend inside the bottle 10, and the interior portion 142 and the coupling portion 141 collectively define a through opening 143 for dispensing the fluid from inside the bottle 10. A valve 144 (e.g., a variable flow valve, etc.) may be in communication with the through opening 143 to restrict the dispensing of the fluid from inside the bottle 10.

The interior portion 142 may include at least one light 146 (e.g., a LED, etc.) and a battery 147 in electrical communication with the light(s) 146. As shown in FIG. 6, a processor 145 may be in data communication with the light(s) 146 for selectively actuating the light(s) 146. The interior portion 142 may include a translucent material to allow the light(s) 146 to illuminate an extended area (e.g., an area larger than would otherwise be lit), and the interior portion 142 may display advertising indicia. More particularly, the interior portion 142 may include advertising indicia 148 (e.g., printed thereon, etched thereon, formed therein, etc.), or a transparent sleeve that includes advertising indicia may be positionable about the interior portion 142. Other backlighting light configurations are also contemplated.

Means for providing data to the pour spout processor 145 may be included. More particularly, the pour spout 140 may include a receiver 147 in data communication with the processor 145 for receiving data from the kiosk transmitter 122 (FIG. 6), and/or the pour spout 140 may include a removable memory device, for example. Though not shown in the accompanying drawings, the pour spout 140 may include a display (e.g., a LCD display, etc.) in data communication with the pour spout processor 145.

The restaurant system 100 may include a headset 150 as shown in FIGS. 1 and 6. The headset 150 may include a speaker 152, a receiver 154 for receiving data from the kiosk transmitter 122, and a processor 155 in data communication with the speaker 152 and the receiver 154. A microphone 156 may be in data communication with the headset processor 155, and a transmitter 157 may be in data communication with the headset processor 155 (FIG. 6). The headset 150 enables drink recipes or the like to be transmitted from the kiosk transmitter 122 to the headset receiver 154 and played through the headset speakers 152, thus assisting the bartender in mixing selected/ordered drinks (FIG. 6). The headset 150 is also important in enabling a waiter to be summoned, as described below.

While the transmitters and receivers described herein may utilize active or passive RFID technology, it should be appreciated that other more traditional data transmission systems as well as those employed in the future may also be appropriate.

Figure 8:
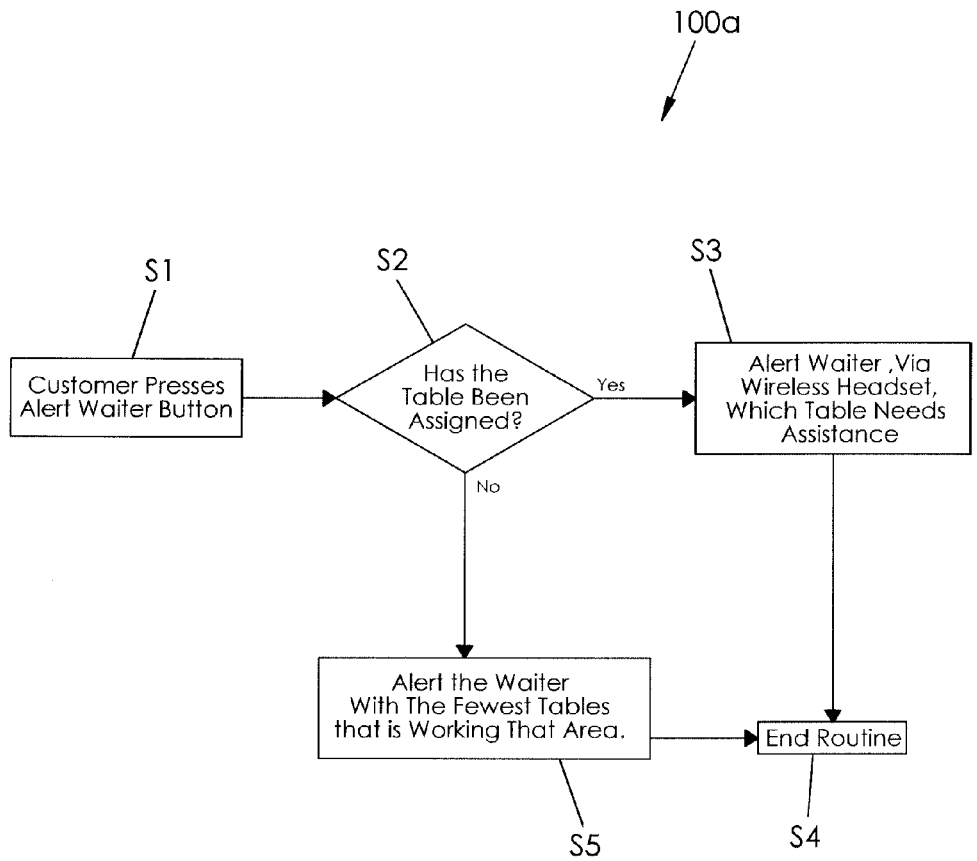
FIG. 8 is a flowchart illustrating one exemplary method for using the restaurant system according to the present invention.

FIG. 8 shows one exemplary method 100a of using the restaurant system 100. At a first step S1, a customer utilizes the input device 116a to request waiter assistance. The kiosk processor 125 (or another appropriate processor) determines if the customer's table has been assigned to a waiter at step S2. If so, the method proceeds to step S3 where the kiosk processor 125 actuates the kiosk transmitter 122 to send data to the headset receiver 154 worn by the appropriate waiter. The headset processor 155 may then actuate the speaker 152 to alert the waiter. The method then ends at step S4. If the customer's table has not been assigned to a waiter, the method instead proceeds to step S5 where the kiosk processor 125 actuates the kiosk transmitter 122 to send data to the headset receiver 154 worn by the waiter closest to the table. The headset processor 155 may then actuate the speaker 152 to alert the waiter. The method then ends at step S4.

Figure 9:
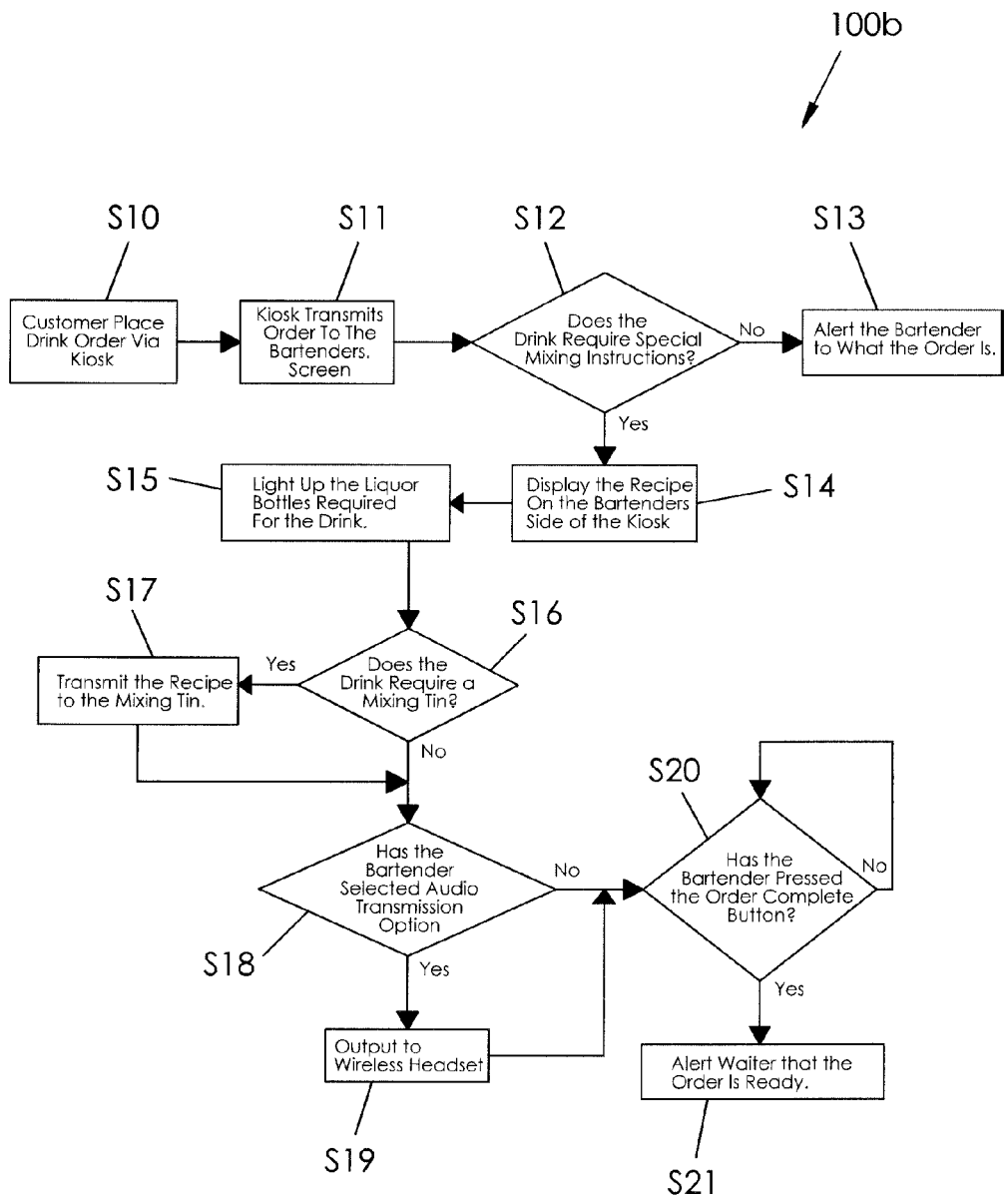
FIG. 9 is a flowchart illustrating another exemplary method for using the restaurant system according to the present invention.
Figure 10:
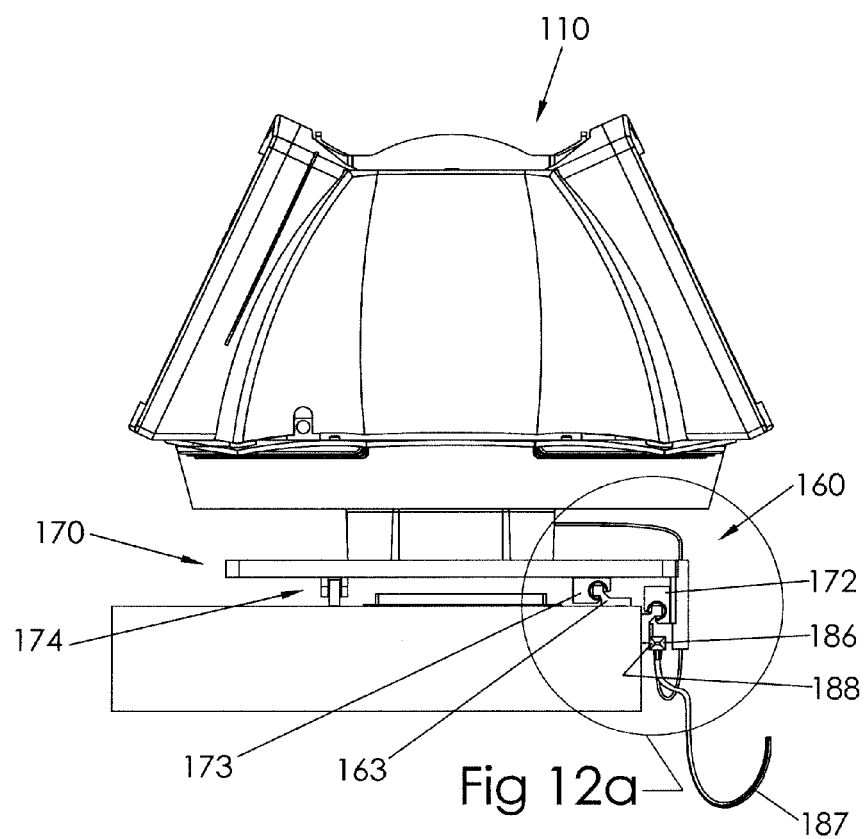
FIG. 10 is an end view of a mobile kiosk system according to another embodiment of the present invention.

FIG. 9 shows another exemplary method 100b of using the restaurant system 100. At step S10, a customer utilizes the input device 116a to place a drink order. The method proceeds to step S11, where the kiosk processor 125 receives the data from the input device 116a and actuates the display 114b so that a bartender may see the order. The kiosk processor 125 may also actuate the display 114a so that the customer may see the order. Additionally, or alternately, the kiosk processor 125 may actuate the display 114a to provide advertising or programming chosen by the customer (as shown in FIG. 7b, for example). The method then proceeds to step S12, where the kiosk processor 125 determines if the drink the customer ordered requires special mixing instructions. If not, the method proceeds to step S13; if so, the method proceeds to step S14.

At step S13, the kiosk processor 125 actuates the kiosk transmitter 122 to transmit data about the drink order to the bartender. The data may be received by the mixing tin receiver 137, and the mixing tin processor 135 may actuate the mixing tin display 134 to convey the drink order to the bartender. Alternately, or additionally, the data may be received by the headset receiver 154, and the headset processor 155 may actuate the headset speaker 152 to convey the drink order to the bartender. The method then ends.

At step S14, the kiosk processor 125 actuates the kiosk display 114b to display the recipe of the drink. The method then proceeds to step S15. At step S15, the kiosk processor 125 actuates the kiosk transmitter 122 to transmit data corresponding to the drink recipe. The pour spout receiver 147 corresponding to the bottle needed to make the drink may receive the recipe data from the kiosk transmitter 122, and the pour spout processor 145 may actuate the pour spout light(s) 146 and/or the pour spout display. Activation of the pour spout light(s) and/or the pour spout display may be considered "back-lighting", though this need not be the case. The method then proceeds to step S16. At step S16, the kiosk processor 125 determines if the drink recipe requires a mixing tin. If so, the method proceeds to step S17; if not, the method proceeds to step S18.

At step S17, the kiosk processor 125 actuates the kiosk transmitter 122 to transmit drink recipe data to the mixing tin receiver 137. The mixing tin receiver 137 may then receive the drink recipe data, and the mixing tin processor 135 may actuate the mixing tin display 134 to convey the drink recipe to the bartender. Activation of the mixing tin display 134 may be considered "back-lighting", though this need not be the case. The mixing tin processor 135 may also (or alternately) actuate the mixing tin light(s) 136. The method then continues to step S18.

At step S18, the kiosk processor 125 determines if the bartender has chosen to receive an audio transmission of the drink recipe. If so, the method proceeds to step S19; if not, the method proceeds to step S20.

At step S19, the kiosk processor 125 actuates the kiosk transmitter 122 to transmit drink recipe data to the headset receiver 154. The headset receiver 154 may then receive the drink recipe data, and the headset processor 155 may actuate the headset speaker 152 to convey the drink recipe to the bartender. The method then continues to step S20.

At step S20, the kiosk processor 125 may determine if the bartender has used the input device 116b to indicate that the drink order has been filled. If not, the method may stay at step S20; if so, the method may continue to step S21. At step S21, the kiosk processor 125 may cause the kiosk display 114a to indicate that the drink has been served. If a waiter is using the kiosk 110 instead of a customer, the kiosk display 114a may indicate to the waiter that the drink is ready to serve.

In yet another exemplary method of using the restaurant system 100, the bartender may speak into the headset microphone 156, and the headset processor 155 may actuate the headset transmitter 157 to transmit data to the kiosk receiver 124. The headset processor 155 may include instructions to recognize the data and proceed accordingly. For example, the bartender may request a recipe for a drink, the headset transmitter 157 may transmit data corresponding to that request, the kiosk receiver 124 may receive the request, and the kiosk processor 125 may understand the request and provide the instructions to the bartender.

Embodiments of the restaurant system 100 set forth above may further include a mobility apparatus 160 that interacts with the electronic kiosk 110 to transport the electronic kiosk 110 between various locations, forming a mobile kiosk system as shown in FIGS. 10 through 15. Though described herein primarily in relation to the bar/restaurant system 100, it should be evident to those of ordinary skill in the art that the mobility apparatus 160 and the electronic kiosk 110 may be useful outside of bar and restaurant settings, and particularly in settings where lining up customers/people is less desirable than dispersing customers/people (e.g., along a counter) and then providing services/attention.

Figure 11:
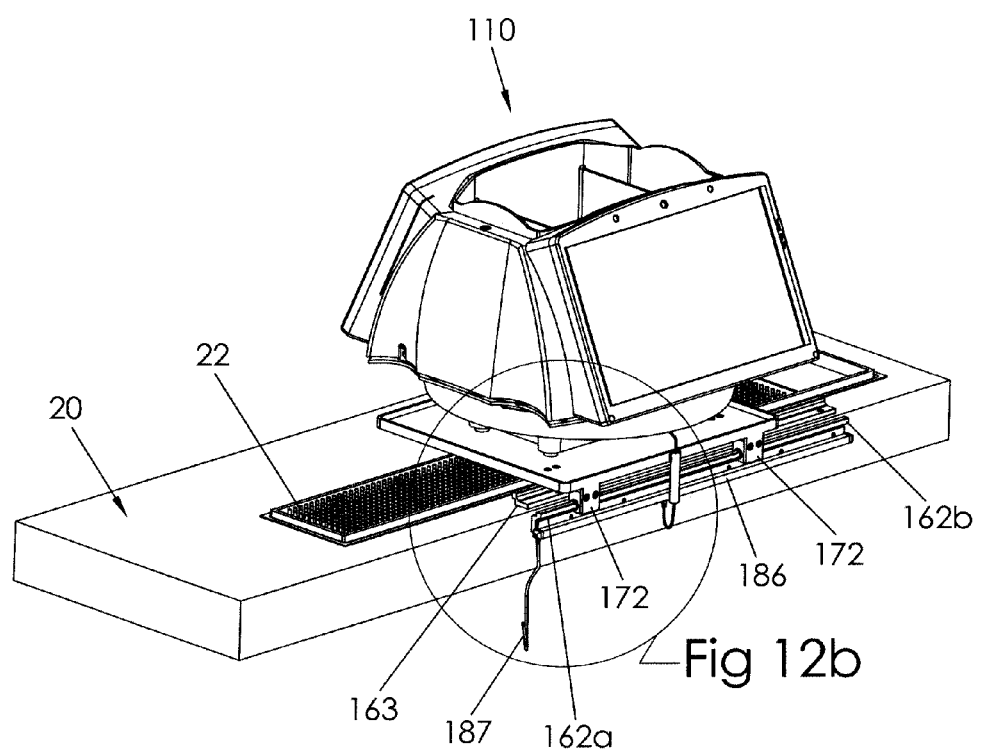
FIG. 11 is a perspective view of the mobile kiosk system as in FIG. 10.
Figure 13:
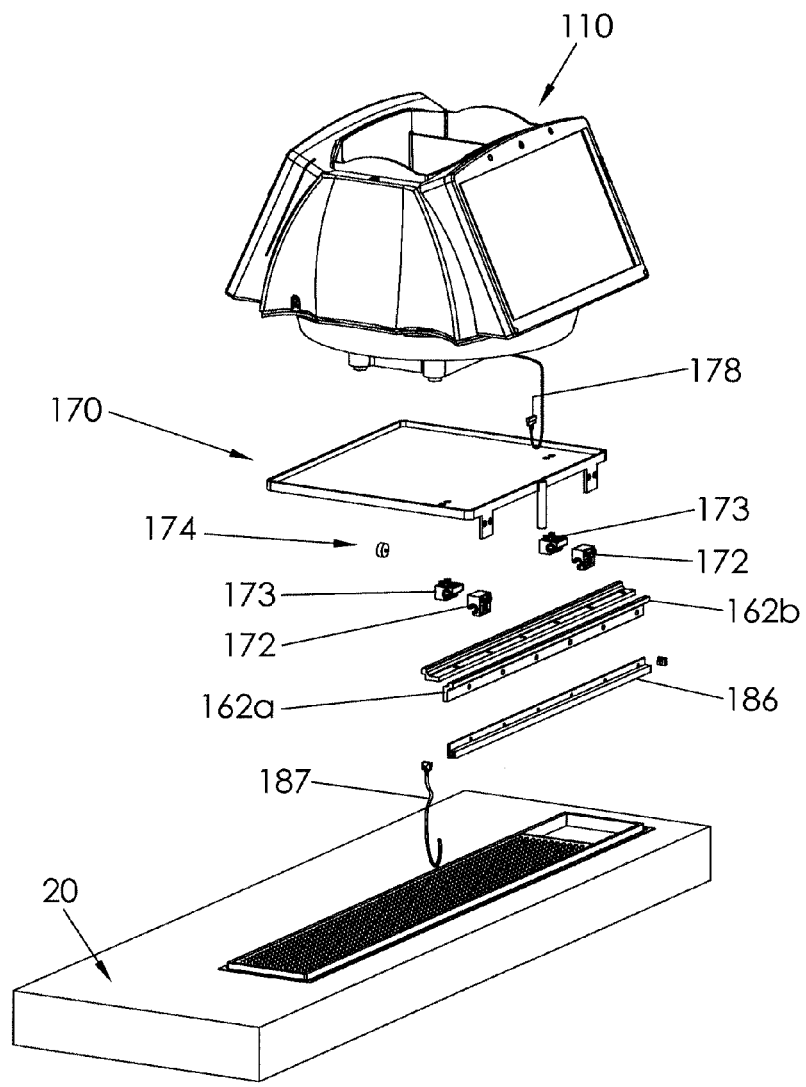
FIG. 13 is an exploded view of the mobile kiosk as in FIG. 11.

The mobility apparatus 160 includes a rail 162 having distal and proximate ends 162a, 162b and extending therebetween (FIGS. 11 and 13). While the rail 162 is shown in the accompanying drawings to be generally linear, other configurations may also be appropriate. Further, the rail may be formed as a cavity instead of a protrusion as illustrated. However, it may be preferable for the rail 162 to extend generally level (i.e., horizontally). It should be appreciated that, in use, the rail 162 may extend as long as desired and will typically extend much further than is shown in the accompanying drawings. The rail 162 is shown in FIG. 11 extending along a bar or countertop 20 having a barmat 22.

The kiosk 110 includes a base 170 that extends adjacent the rail 162, as shown for example in FIG. 11, and the base 170 may be separable from the kiosk 110 (FIG. 13) or may be unitary with the kiosk 110. Means are included for allowing the base 170 to move only along the rail 162 between the rail distal and proximate ends 162a, 162b. For example, a coupling member 172 (FIGS. 10 through 13) may be coupled to (or formed in) the base 170, and the coupling member 172 may include a configuration that is complementary to the rail 162 so as to limit movement of the coupling member 172 away from the rail 162 while allowing movement of the base 170 along the rail 162 between the ends 162a, 162b. In some embodiments, the coupling member 172 and/or the rail 162 may include multiple portions separated from one another, such as shown in FIG. 11, for example. In addition, one or more rail 163 that is generally parallel to the rail 162 and one or more coupling member 173 that is complementary to rail(s) 163 may be included to further limit movement of the base 170 away from the rail 162. Further, at least one wheel 174 (FIGS. 10 and 13), gear, or ball bearing (or any combination of those elements and/or similar elements) may support at least a portion of the kiosk's weight while allowing movement of the base 170 along the rail 162 between the ends 162a, 162b. Supporting some of the weight of the kiosk 110 may prevent or reduce torque on the mobility apparatus 160.

In use, then, the kiosk 110 may be physically pushed or pulled along the rail 162 between the ends 162a, 162b. Alternately, though not shown in the figures, movement of the kiosk 110 along the rail 162 may be mechanized (e.g., through gearing, wheel 174, belts, etc.). Mechanization of the kiosk along the rail 162 will be understood by those in the art in light of the description contained herein and is accordingly not addressed further. By being movable, a single kiosk 110 may serve multiple patrons. This may reduce the installation and maintenance costs of restaurant systems 100.

Various means may be included for transmitting an electrical current to power the elements of the kiosk 110 (e.g., the display 114a, the display 114b, the input device 116a, the input device 116b, the card reader 118, the transmitter 122, the receiver 124, the processor 125, etc.). For example, an inductive connection 180 (FIG. 14) and/or a conductive connection 185 (FIG. 15) may be used.

Figure 14:
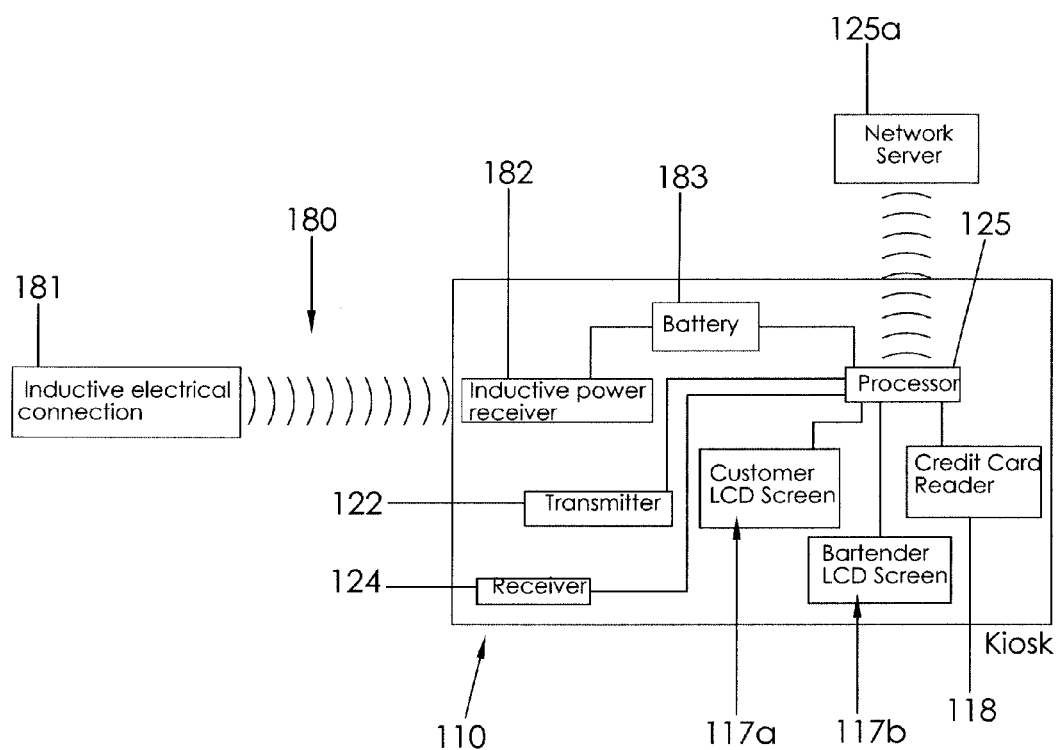
FIG. 14 is a block diagram of the electronic components according to one variation of the mobile kiosk system of FIG. 11.
Figure 15:
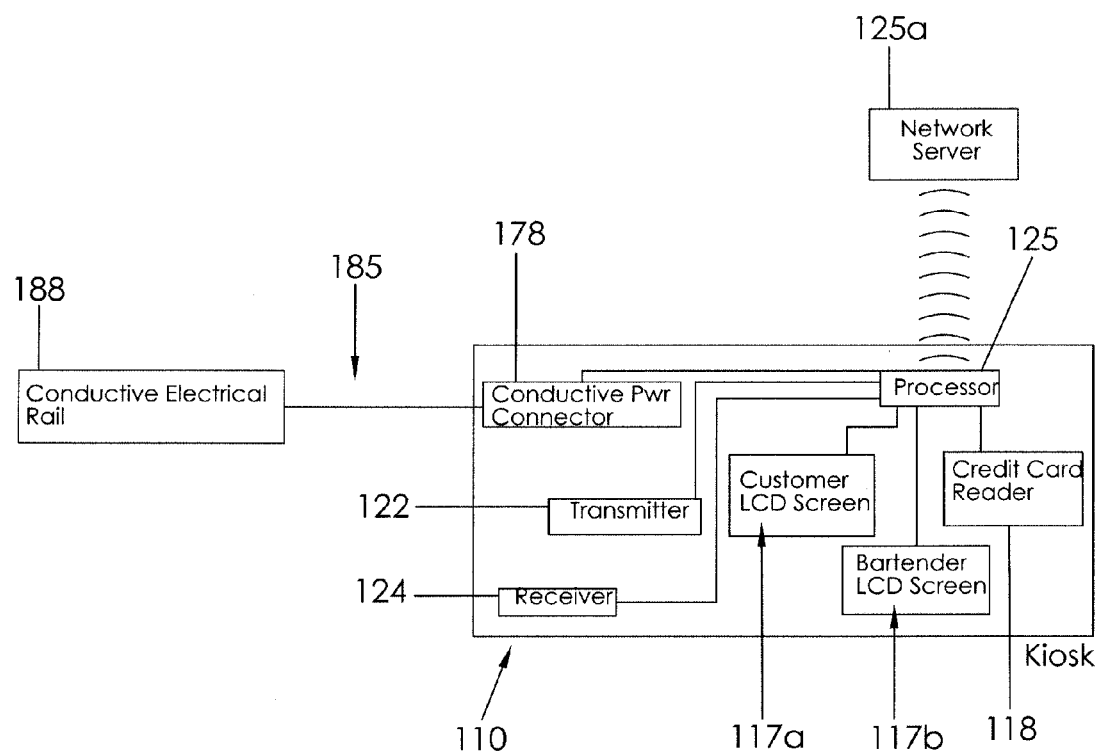
FIG. 15 is another block diagram of the electronic components according to another variation of the mobile kiosk system of FIG. 11.

For the inductive connection 180, an inductive electrical transmitter 181 may be positioned along the rail 162 at a "home" position, and electrical current may be transmitted to an inductive electrical receiver 182 from the transmitter 181 when the receiver 182 is adjacent the transmitter 181 (FIG. 14). Current may then be stored in a battery 183 (FIG. 14) for use when the kiosk 110 (and therefore the receiver 182) is not adjacent the home position.

Figure 12A:
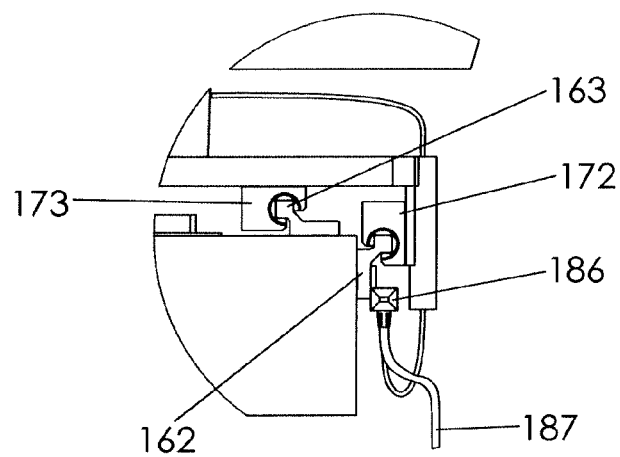
FIG. 12a is an isolated view on an enlarged scale taken from FIG. 10.
Figure 12B:
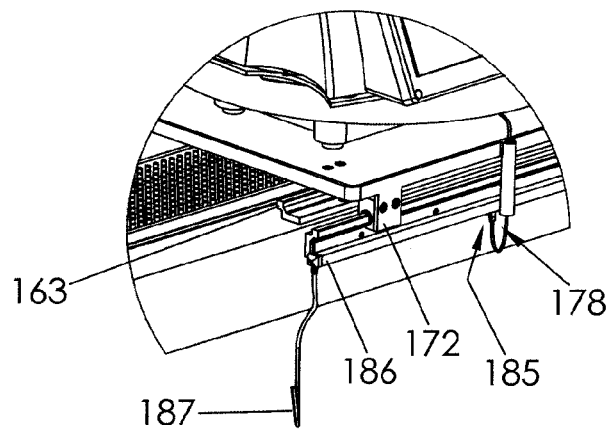
FIG. 12b is an isolated view on an enlarged scale taken from FIG. 11.

For the conductive connection 185, a track 186 (FIGS. 10 through 13) may extend along the rail 162 and may be coupled to or separate from the rail 162. A power cord 187 (e.g., a power cord configured to electrically interact with an electrical outlet) or other appropriate apparatus may couple the track 186 to a power source. Complementary portions 188 of the track 186 (FIGS. 10 and 15) and 178 of the base 170 (FIGS. 12b, 13, and 15), which are movable relative to one another while electricity is being passed therebetween, actually form the conductive connection 185. As shown in FIG. 12b, the conductive connection 185 may be shielded from inadvertent contact by being located behind the track 186, and other or additional shielding may be used, as one of skill in the art will appreciate.

Accordingly, whether an inductive connection 180 (FIG. 14) and/or a conductive connection 185 (FIG. 15) is used, the kiosk 110 may be powered at the various locations along the rail 162.

In another embodiment of the conductive connection (not shown), it is understood that the bottom of the kiosk 110 may include grooves, either extending into the bottom or protruding therefrom. Electrical connectors are positioned in these grooves for electrical communication with the rail 162 as the kiosk 110 moves along the rail 162. In still another embodiment (not shown), at least one rechargeable battery may be installed into a mobile power mat, e.g. in the mat 22 shown in FIGS. 11 and 13 that is positioned lowerly adjacent the rail 162 Power may be transferred from the battery cells to the track 186 with electrical connections substantially as described above. Preferably, the at least one battery may supply electricity to the track 186 (through a power cord) for up to 2 days after being charged.

It is understood that while certain forms of this invention have been illustrated and described, it is not limited thereto except insofar as such limitations are included in the following claims and allowable functional equivalents thereof.

The invention claimed is:

1. A mobile kiosk system, comprising:
  a rail having distal and proximate ends and extending therebetween;
  an electronic kiosk having an input device and an output device for interaction with a person, said electronic kiosk having a base extending adjacent said rail;
  a coupling member coupled to said base proximate a first side of said base, said coupling member having a configuration that is complementary to said rail to limit movement of said coupling member away from said rail and allow movement of said base along said rail between said rail distal and proximate ends;

an auxiliary rail inwardly adjacent and parallel to said rail, said auxiliary rail being proximate said first side of said base;

an auxiliary coupling coupled to said base and having a configuration complementary to said auxiliary rail so as to further limit movement of said coupling member away from said rail and allow movement of said base along said rail between said rail distal and proximate ends;

a single wheel displaced from said rail and from said auxiliary rail configured to support at least a portion of said electronic kiosk's weight while allowing movement of said base along said rail between said rail distal and proximate ends, said single wheel situated proximate a second side of said base opposite said base first side;

a processor in data communication with said input device and said output device to receive data from said input device and to actuate said output device;

means for transmitting an electrical current to power at least one of said processor, said input device, and said output device;

wherein said means for transmitting an electrical current includes at least one of:
(a) a track extending along said rail;
  a power cord electrically coupled to said track and configured to electrically interact with an electrical outlet;
  a conductive connection having complementary portions of said track and said base that are movable relative to one another while electricity is being passed therebetween; and
(b) an inductive connection and a battery.

2. The system of claim 1, wherein said means for transmitting an electrical current includes at least one of an inductive connection and a conductive connection.

3. The system of claim 1, wherein said conductive connection is shielded from inadvertent contact.

4. The system of claim 1, wherein:
said electronic kiosk has generally opposed first and second sides extending upwardly from said base;
said output device is a first display on said electronic kiosk first side for use by a customer;
a second display is on said electronic kiosk second side for use by another person;
said input device is on said electronic kiosk first side for use by the customer;
wherein said first and second sides of said kiosk are connected by side walls to form a housing enclosing said first and second displays atop said base; and
wherein said housing defines a storage area extending between said first and second sides of said kiosk and having an open top.

5. The system of claim 4, wherein said first display and said input device is a touch screen.

6. The system of claim 4, wherein said storage area is configured to hold at least one of a napkin or a condiment.

7. The system of claim 4, wherein said first input device includes a card reader for receiving payment.

8. The system of claim 1, wherein said base is separable from said electronic kiosk.

9. The system of claim 1, further comprising:
a mat lowerly adjacent said rail;
at least one battery situated in said mat;
wherein said electric kiosk includes a plurality of grooves;
means situated in said grooves for transmitting a current from said at least one battery to power at least one of said processor, said input device, and said output device.

10. The system of claim 1, wherein said battery is rechargeable.

11. The system of claim 1, wherein said first and second sides, said housing, said storage area, said first display, said base, and said second display are configured in a unitary construction.

* * * * *